(No Model.)

H. W. SMITH.
ADJUSTABLE COLTER AND SCRAPER FOR COTTON CULTIVATORS.
No. 589,311. Patented Aug. 31, 1897.

Witnesses:
Franck L. Ourand.
Jos. L. Coombs

Inventor:
Harry W. Smith,
G. Louis Bagger & Co.
Attorneys.

UNITED STATES PATENT OFFICE.

HARRY WILLIAM SMITH, OF PARAGOULD, ARKANSAS, ASSIGNOR OF ONE-HALF TO JAMES R. McDONALD, OF SAME PLACE.

ADJUSTABLE COLTER AND SCRAPER FOR COTTON-CULTIVATORS.

SPECIFICATION forming part of Letters Patent No. 589,311, dated August 31, 1897.

Application filed April 13, 1897. Serial No. 631,907. (No model.)

*To all whom it may concern:*

Be it known that I, HARRY WILLIAM SMITH, a citizen of the United States, and a resident of Paragould, in the county of Greene and State of Arkansas, have invented certain new and useful Improvements in Adjustable Colters and Scrapers for Cotton-Cultivators; and I do hereby declare that the following is a full, clear, and exact description of the invention, which will enable others skilled in the art to which it appertains to make and use the same, reference being had to the accompanying drawings, which form a part of this specification.

My invention relates to adjustable colters and scrapers for cotton-cultivators; and its object is to provide an improved construction of the same whereby the colter or scraper may be adjusted vertically, so as to vary its height with relation to the ground, and also be adjusted with respect to the angle at which it strikes the ground.

The invention consists, essentially, in a cultivator the beam of which is formed with an inclined slot or opening extending from top to bottom of the same, a bottom plate secured to the under side of the beam, a slotted top plate secured to the upper side of the beam, provided with upwardly-extending lugs formed with alined holes, and a colter or scraper passing through said plates and beam and provided with a series of holes, and a removable pin passing through the holes in the lugs, the construction being such that by removing said pin the colter or scraper can be adjusted vertically or angularly, as hereinafter fully described and claimed.

Figure 1:
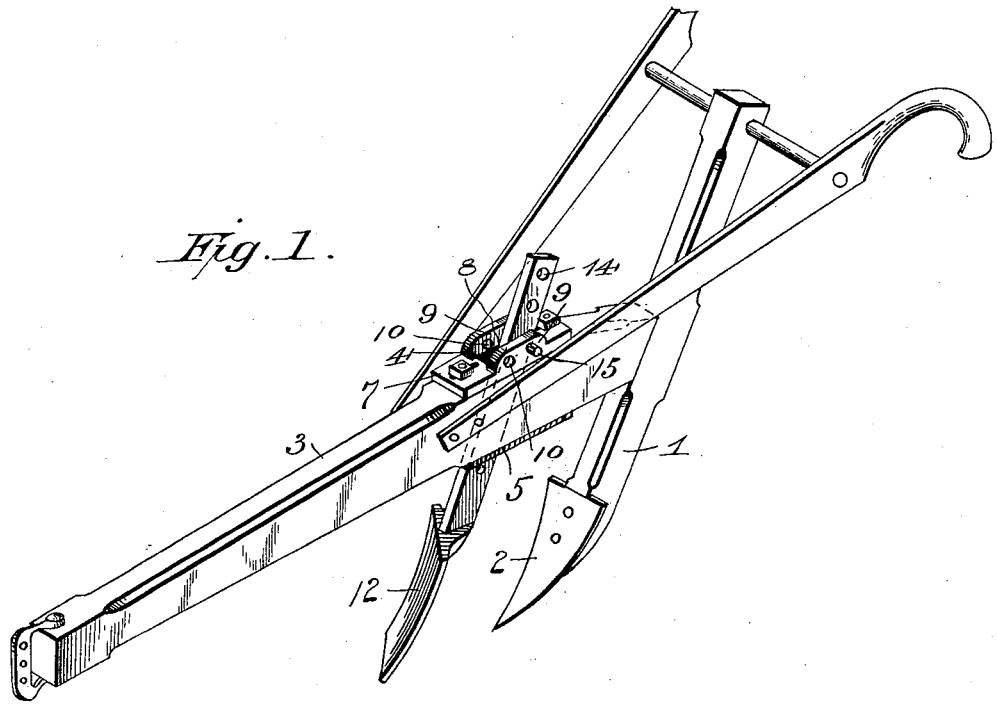
Figure 2:
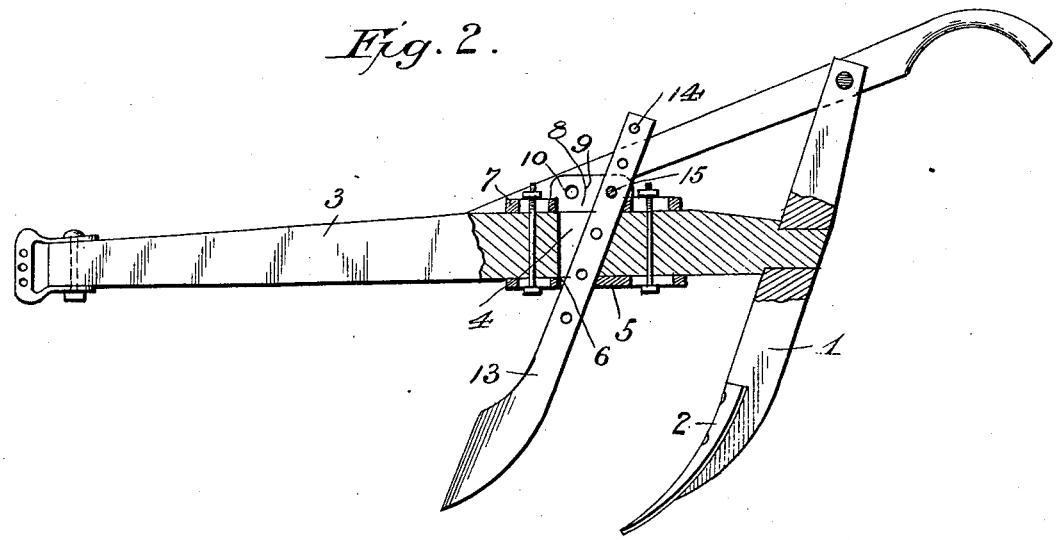

In the accompanying drawings, Figure 1 is a perspective view of a cotton-cultivator constructed in accordance with my invention, showing the same provided with an adjustable scraper. Fig. 2 is a longitudinal sectional view showing the cultivator provided with a colter.

In the said drawings the numeral 1 designates the sheth or standard, provided with the usual cultivator-shovel 2.

The numeral 3 designates the beam, formed with an inclined opening or slot 4, extending from top to bottom thereof. Secured to the under side of the beam is a plate 5, formed with a slot 6, and secured to the upper side of the beam is a plate 7, formed with a slot 8. This plate 7 is also formed with two upwardly-extending opposite lugs 9, having therein a series of opposite or alined horizontal holes 10.

The numeral 12 designates a scraper, and the numeral 13 a colter, the shanks of which are formed with a number of holes 14 for the passage of retaining-pin 15.

In using the cultivator the shank of the scraper or colter is passed up through the slot in the bottom plate, the opening in the beam, and the slot in the upper plate, and is secured in place by passing the pin through the holes therein and in the lugs. To adjust the colter or scraper vertically, the pin is removed and the colter or scraper raised or lowered, as the case may be. By removing the pin and moving the colter or scraper forward or backward the angle of the latter with respect to the beam may be changed or varied.

The top and bottom plates 3 and 5 at opposite sides of the central slot therein are formed with longitudinal openings 16 for the passage of bolts 17, provided with nuts 18. By loosening the said nuts the plates may be adjusted longitudinally on the beam, whereby the angle of the colter or scraper may be still further varied.

Having thus fully described my invention, what I claim is—

In a cotton-cultivator, the combination with the beam having an inclined opening thereon, the adjustable bottom plate having a central slot and a longitudinal opening at each end thereof, the adjustable slotted top plate provided with longitudinal openings, and formed with lugs having alined holes therein, and the bolts and nuts, of the colter or scraper, the shank of which is provided with a series of holes and the retaining-pin, substantially as described.

In testimony that I claim the foregoing as my own I have hereunto affixed my signature in presence of two witnesses.

HARRY WILLIAM SMITH.

Witnesses:
TOM WHITE,
MOSS TODD.